(12) United States Patent
Johnson et al.

(10) Patent No.: US 10,311,616 B2
(45) Date of Patent: Jun. 4, 2019

(54) METHODS AND APPARATUS TO DEFINE AUGMENTED CONTENT REGIONS FOR AUGMENTED REALITY SYSTEMS

(71) Applicant: Intel Corporation, Santa Clara, CA (US)

(72) Inventors: Derick A. Johnson, Folsom, CA (US); David I. Poisner, Carmichael, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/639,435

(22) Filed: Jun. 30, 2017

(65) Prior Publication Data

US 2019/0005695 A1    Jan. 3, 2019

(51) Int. Cl.
| | |
|---|---|
| G06T 11/60 | (2006.01) |
| G06T 19/00 | (2011.01) |
| G06K 9/46 | (2006.01) |

(52) U.S. Cl.
CPC ............ *G06T 11/60* (2013.01); *G06K 9/4609* (2013.01); *G06T 19/006* (2013.01); *G06T 2210/21* (2013.01)

(58) Field of Classification Search
CPC ..... G06T 19/006; G06T 7/70; G06T 2215/16; G06F 3/04815; G06F 3/012; G06F 17/3087; G06F 2221/2111; G06F 3/013; G06F 3/016; H04M 1/72572; H04M 3/42348; H04W 4/02; H04W 4/023; H04W 4/026; H04W 4/185; H04N 21/25841
See application file for complete search history.

(56) References Cited

U.S. PATENT DOCUMENTS

| | | | |
|---|---|---|---|
| 6,741,242 B1 * | 5/2004 | Itoh | G06T 15/00 |
| | | | 345/419 |
| 9,398,408 B2 | 7/2016 | Johnson et al. | |
| 2004/0203863 A1 | 10/2004 | Huomo | |
| 2008/0086264 A1 * | 4/2008 | Fisher | G01C 21/30 |
| | | | 701/533 |
| 2009/0150514 A1 * | 6/2009 | Davis | H04L 29/12028 |
| | | | 709/217 |
| 2009/0209267 A1 | 8/2009 | Jagetiya | |

(Continued)

FOREIGN PATENT DOCUMENTS

| | | |
|---|---|---|
| KR | 2012009834 A | 2/2012 |
| WO | 2013147725 A1 | 10/2013 |

OTHER PUBLICATIONS

United States Patent and Trademark Office, "Non-Final Office Action", issued in connection with U.S. Appl. No. 14/229,561, dated Sep. 3, 2015, 23 pages.

(Continued)

*Primary Examiner* — Sultana M Zalalee
(74) *Attorney, Agent, or Firm* — Hanley, Flight & Zimmerman, LLC.

(57) ABSTRACT

Methods and apparatus to generate augmented content regions for augmented reality (AR) systems are disclosed. An example method includes receiving from a plurality of AR devices data representing a plurality of sight lines captured using the plurality of AR devices, identifying a plurality of commonalities of the plurality of sight lines based on the data representing the plurality of sight lines, and defining an augmented content region based on the plurality of commonalities.

19 Claims, 6 Drawing Sheets

(56) References Cited

U.S. PATENT DOCUMENTS

| | | | |
|---|---|---|---|
| 2011/0159890 A1 | 6/2011 | Fortescue et al. | |
| 2011/0177831 A1* | 7/2011 | Huang | H04W 64/003 455/457 |
| 2012/0197696 A1* | 8/2012 | Beyeler | G01C 21/3682 705/14.4 |
| 2012/0233000 A1* | 9/2012 | Fisher | G06Q 30/02 705/14.71 |
| 2014/0004885 A1 | 1/2014 | Demaine | |
| 2014/0006146 A1* | 1/2014 | Uribe-Etxebarria Jimenez | G06Q 30/0251 705/14.49 |
| 2014/0292511 A1* | 10/2014 | Sheha | G01C 21/20 340/539.13 |
| 2014/0294361 A1* | 10/2014 | Acharya | G11B 27/10 386/241 |
| 2014/0337477 A1* | 11/2014 | Fisher | H04L 65/601 709/219 |
| 2014/0370911 A1* | 12/2014 | Gorgenyi | H04W 52/0251 455/456.1 |
| 2015/0130703 A1 | 5/2015 | Ghajar | |
| 2015/0237475 A1* | 8/2015 | Henson | H04W 4/021 455/456.3 |
| 2015/0281887 A1* | 10/2015 | Johnson | H04W 4/021 455/456.3 |
| 2015/0350827 A1* | 12/2015 | Birch | H04W 8/04 455/456.1 |
| 2016/0054891 A1* | 2/2016 | Angelescu | G01C 21/3682 345/629 |
| 2017/0048667 A1 | 2/2017 | Johnson et al. | |
| 2018/0077648 A1* | 3/2018 | Nguyen | H04W 52/0229 |

OTHER PUBLICATIONS

United States Patent and Trademark Office, "Final Office Action", issued in connection with U.S. Appl. No. 14/229,561, dated Dec. 21, 2015, 17 pages.

United States Patent and Trademark Office, "Advisory Action", issued in connection with U.S. Appl. No. 14/229,561, dated Mar. 2, 2016, 3 pages.

United States Patent and Trademark Office, "Notice of Allowance", issued in connection with U.S. Appl. No. 14/229,561, dated Mar. 30, 2016, 13 pages.

United States Patent and Trademark Office, "Non-Final Office Action", issued in connection with U.S. Appl. No. 15/184,712, dated Nov. 23, 2016, 14 pages.

Patent Corporation Treaty, "International Preliminary Report on Patentability", issued in connection with International Application No. PCT/US2012/030483, dated Oct. 1, 2014, 6 pages.

Patent Corporation Treaty, "Written Opinion", issued in connection with International Application No. PCT/US2012/030483 dated Nov. 28, 2012, 5 pages.

Patent Corporation Treaty, "International Search Report", issued in connection with International Application No. PCT/US2012/030483, dated Nov. 28, 2012, 3 pages.

* cited by examiner

METHODS AND APPARATUS TO DEFINE AUGMENTED CONTENT REGIONS FOR AUGMENTED REALITY SYSTEMS

FIELD OF THE DISCLOSURE

This disclosure relates generally to augmented reality (AR) systems and, more particularly, to methods and apparatus to define augmented content regions for AR systems.

BACKGROUND

Geolocation technologies such as those implemented using the Global Positioning System (GPS) can be used by smartphones and other GPS-equipped devices to obtain content on locations of interest based on a user's geographic location.

The figures are not to scale. Wherever possible, the same reference numbers will be used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Example methods and apparatus disclosed herein generate (e.g., create, define, select, etc.) augmented content regions (e.g., areas, zones, spaces, volumes, surfaces, etc. in 2D or 3D space) having associated augmented content based on augmented reality (AR) usage data (e.g., sight lines) collected for a plurality of AR devices or, more generally, location aware devices in the same geographic area. For example, usage data for a plurality of location aware devices while they were located and operating in a city plaza, possibly at various times, displaying a plurality of statues. In some examples, augmented reality refers the presentation of content in addition to (e.g., alongside, on top of, overlaid on, etc.) real or physical content that a user is seeing. The additional content augments the real or physical content that the user is seeing. For example, the augmented content may be overlaid opaquely on the lens(es) of a pair of smart glasses through which a wearer is looking at a physical, real object. Augmented reality is sometimes also referred to as mixed reality, merged reality, hybrid reality, etc. For simplicity, the term augmented reality will be used herein.

Reference will now be made in detail to non-limiting examples of this disclosure, examples of which are illustrated in the accompanying drawings. The examples are described below by referring to the drawings.

Figure 1:
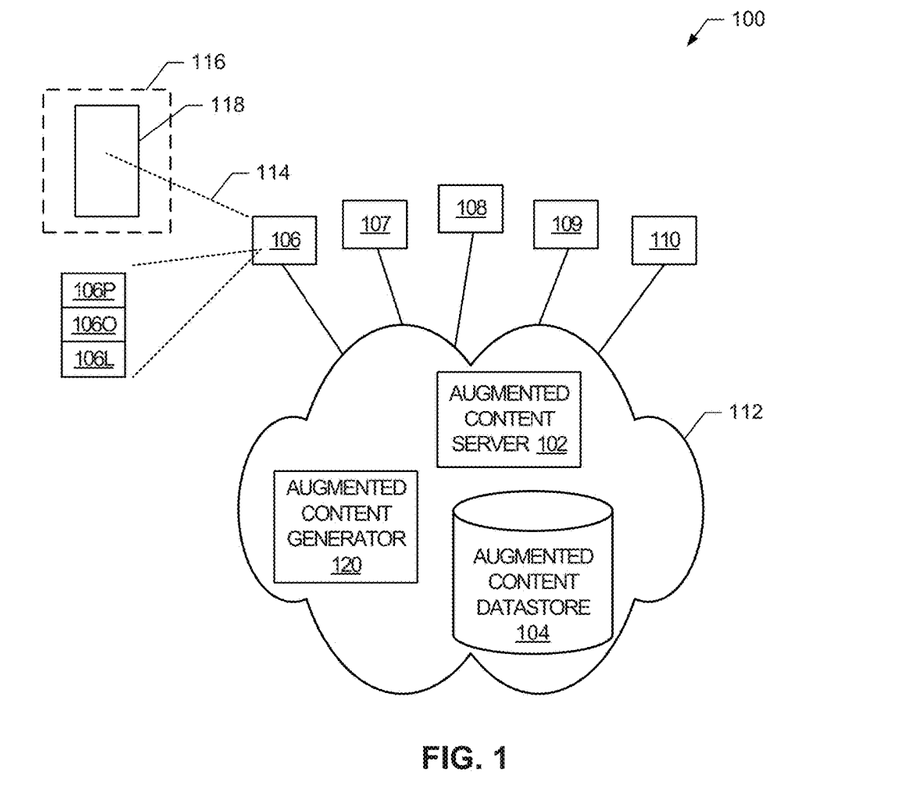
FIG. 1 is a block diagram of an example system for providing augmented content to AR devices, according to this disclosure.

FIG. 1 is block diagram of an example system 100 for generating and providing augmented content for AR systems. To provide AR content or, more generally, augmented content, the example system 100 of FIG. 1 includes an example augmented content server 102, and an example augmented content datastore 104. The example augmented content server 102 of FIG. 1 provides augmented content to a plurality of AR devices or, more generally, location aware devices 106, 107, 108, 109, and 110. The example location aware devices 106-110 communicate with the example augmented content server 102 using any number and/or type(s) of local connections (e.g., Bluetooth®, near field communication (NFC), universal serial bus (USB), etc.), wireless local area networks (WLANs) a.k.a. wireless fidelity (Wi-Fi®) networks, cellular networks, private networks, and/or public networks, such as the Internet 112.

Using the location and orientation of a given location aware device (e.g., the location aware device 106), it can be determined whether a sight line 114 of the location aware device 106 intersects an augmented content region 116 (e.g., a virtual bounding box around a statue 118). The example augmented content region 116 is associated with the example statue 118. Thus, when it is detected that the location aware device's sight line 114 intersects the augmented content region 116, augmented content (e.g., information about, related to, etc. the statue 118) associated with the augmented content region 116 is provided (e.g., downloaded) to the location aware device 106. Using known mathematical expressions (e.g., from trigonometry, geometry, and vector mechanics), the path of a sight line can be computed based on its origin (e.g., the location of a location aware device) and its outward angle (in three dimensions) from the location aware device. Points along the path of the sight line can be compared with the boundaries and surfaces that define an augmented content region (e.g., the augmented content region 116) in space to determine whether the sight line intersects the augmented content region. Augmented content regions may be specified in the augmented content datastore 104 using, for example, a shape type, the dimension(s) of the shape and the location of the shape, etc. In some examples, augmented content regions are specified more generally using any mathematical definitions of vertices, edges, surfaces, etc.

In some examples, the system 100 only considers a sight line when a user, for example, manually presses a button on their location aware device (e.g., the location aware device 106) to capture and send their current sight light (e.g., the sight line 114) information to the augmented content server 102. In some examples, the location aware device sends the coordinates of its location 106P (e.g., GPS coordinates in latitude, longitude, and altitude) and data representing its orientation 106O (e.g., a bearing or heading, and a pitch), and the configured length 106L of the sight line. In some examples, the augmented content is presented together (e.g., alongside, overlaid, etc.) with real content. For example, the augmented content may be overlaid opaquely on the lens(es) of a pair of smart glasses through which a wearer is looking.

The example augmented content server 102 of FIG. 1 accesses the augmented content from the example augmented content datastore 104 based on the augmented content region (e.g., the augmented content region 116) intersected by a sight line (e.g., the sight line 114). Example augmented content includes, but is not limited to, text, video, music, narration, drawings, illustrations, images, graphics, software, firmware, email, web pages, applications, e-services, voice, data, haptic outputs, textures, smells, sounds, etc. Augmented content may be offered free of charge, with a subscription, or for a fee. Once defined, an augmented content region may be regarded as virtual or real property, having an owner to whom it is registered in a database (e.g., the example augmented content datastore 104). Alternatively, it may be dedicated to the public, or subject to an open license for use by others. Ownership of the augmented content region may be separate from ownership of any real object within its coordinates, or they may be bundled together.

In some examples, the example augmented content datastore 104 of FIG. 1 also includes additional information, such as, information identifying an owner of an augmented content region, an owner of augmented content, billing information, etc. The example augmented content datastore 104 may be implemented using any number and/or type(s) of data structures, and stored on any number and/or type(s) of volatile and/or non-volatile computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

Figure 2A:
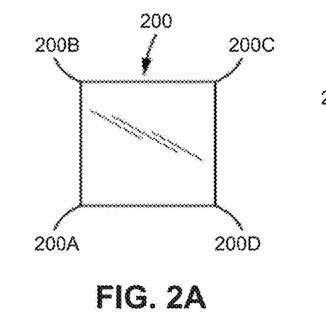
FIGS. 2A, 2B and 2C illustrate respective example augmented content region shapes.
Figure 2B:
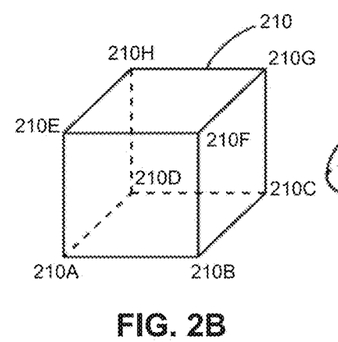
Figure 2C:
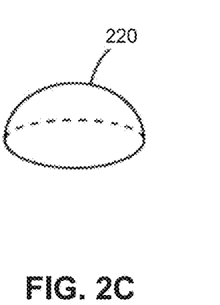

An augmented content region is a virtual area or volume in 2D or 3D space bounded by any number of lines and/or surfaces. While an augmented content region may be associated with a physical object (e.g., a statue, a painting, a mountain, etc.), an augmented content region is a virtual construct, and need not have the same shape as the associated physical object. Aspects of an augmented content region may correspond to something physical, like the perimeter of a statue or the corners of a wall, or they may simply be points in space of interest to someone. Example augmented content region shapes are shown in FIGS. 2A, 2B and 2C. FIG. 2A illustrates an example 2D augmented content region 200 defined by the coordinates of its four corners 200A, 200B, 200C and 200D. While the example augmented content region 200 is a square, any other shape that may be used to define a 2D region may be implemented, such as a rectangle, a polygon, a circle, an ellipse, etc.

FIG. 2B illustrates an example 3D augmented content region 210 in the form of a 3D volume of space, such as a cube 210 defined by vertices 210A, 210B, 210C, 210D, 210E, 210F, 210G, and 210H. While the example augmented content region 210 is cube, other shapes that may be used to define a volume of space may be implemented, such as a box, a right cylinder, a polyhedron, a sphere, a hemisphere 220 (see FIG. 2C), or any portion thereof that may be used to define a volume of space. Hence, there are 2D shapes that determine 2D augmented content regions, and 3D shapes that enclose 3D augmented content region volumes. 3D augmented contention regions may have planar surfaces, concave surfaces, convex surfaces, and combinations thereof.

In some examples, an AR device or, more generally, a location aware device (e.g., the example location aware device 106) is a device that is capable of being aware of or determining its location with respect to a coordinate system. Example AR devices or, more generally, location aware devices include, but are not limited to, tablets, notebook computers, portable computers, personal computers, smartphones, smart glasses, smart watches, head-mounted displays, image capture devices, mobile internet devices, game consoles, media players, cameras, video cameras, telescopes, etc. Various geolocation technologies (e.g., GPS, radar, sonar, NFC, cellular tower triangulation, WLAN or Wi-Fi triangulation, radio frequency identification (RFID), laser positioning, Bluetooth, etc.) can be used to determine (e.g., estimation, measurement, detection, etc.) the location of a location aware device 106-110. In some examples, location aware devices determine their orientation as well as their position. For instance, some example smartphones, head-mounted displays, smart glasses, etc. are equipped with an accelerometer, a gyroscope, a compass, and/or a magnetometer. Using, for example, basic vector mechanics, data from these components can be used to determine the direction in which the device is oriented.

In some examples, a sight line (e.g., the example sight line 114) is a virtual or conceptual line (e.g., ray, vector, etc.) extending outward from the location (e.g., expressed as GPS coordinates) of the location aware device (e.g., the example location aware device) along a direction determined by the location aware device's orientation (e.g., expressed as direction and pitch). In general, a sight line is determined based on physical aspects of a location aware device. For a location aware device, such as a camera or a device having an optical feature (e.g., a viewfinder), orientation can be determined using, for example, an optical path of the viewfinder. For a wearable device, such as smart glasses, head-mounted displays, etc. equipped with a camera that, in use, has an orientation generally coincident with a user's head, its sight line 304 can used as an approximation of the user's gaze direction. While a user's gaze and their location aware device's sight line may be generally coincident, they may be different. Moreover, the sight line of a location aware device need not be associated with any device that has an optical axis (e.g., a camera, a lens, etc.). For example, consider a location aware device in the form of a tablet device with a plain bottom not having a camera, and a top having a screen. If the tablet is held so the bottom is vertical and pointed North, then the sight line of the tablet is horizontal and extends northward, even though the tablet does not have a device with an optical axis on the bottom. A user viewing the screen would be gazing horizontally and North, even if they were looking at the screen from the side. For other devices, such as smart watches, wearables, smartphones, etc. a user may be prompted to select an orientation. A gaming or virtual reality wand or controller might be adapted to include GPS, and the orientation of the wand used to determine a sight line.

Figure 3:
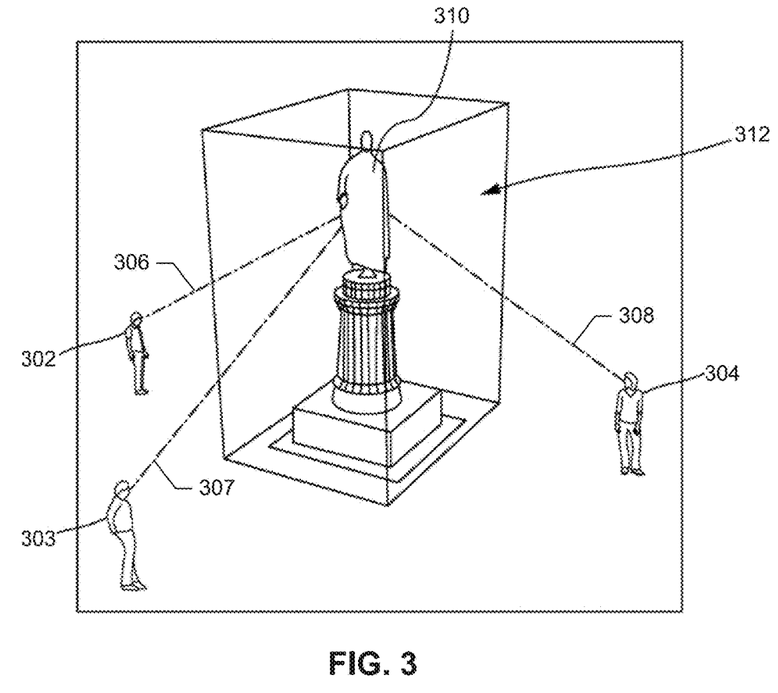
FIG. 3 illustrates example sight lines intersecting an augmented content region.
Figure 4:
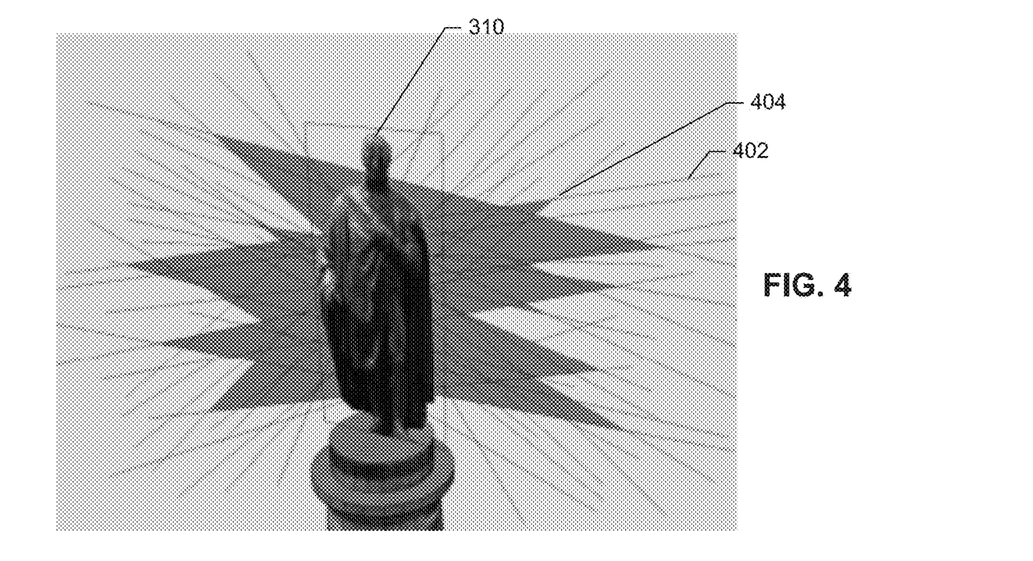
FIG. 4 illustrates example sight line intersections that can be used to define an augmented content region, according to this disclosure.

To generate augmented content regions, the example system 100 includes an example augmented content generator 120. When a plurality of sight lines for a plurality of location aware devices were or are directed toward the same or similar geographic area, object, etc., it is likely that many AR users are interested in augmented content for the geographic area, object, etc. For example, in FIG. 3, three users 302, 303 and 304 are associated with respective sight lines 306, 307 and 308 directed toward a statue 310. When there is not an augmented content region already associated with the statue 310, the augmented content generator 120 automatically defines an augmented content region 312 that can be used to provide augmented content. To define the augmented content region 312, the example augmented content generator 120 of FIG. 1 identifies pairwise commonalities (intersections, overlap, etc.) of a plurality of sight lines (one of which is designated at reference numeral 402), which may include the sight lines 306-308 of FIG. 3. The sight lines 306-308 of the location aware devices 302-304 need not have occurred at the same time, nor be directed to precisely the same location. The example augmented content generator 120 defines an augmented content region based on the intersections. An augmented content region can be defined (e.g., sized, selected, generated, adjusted, etc.) to encompasses some or all the intersections. In some examples, curve fitting is used to define an augmented content region. An augmented content regions may have any 2D or 3D shape, and may be bounded by any number of lines. In some examples, augmented content regions are selected from basic geometric shapes (e.g., rectangles, rectangular boxes, circles, etc.).

Figure 5:
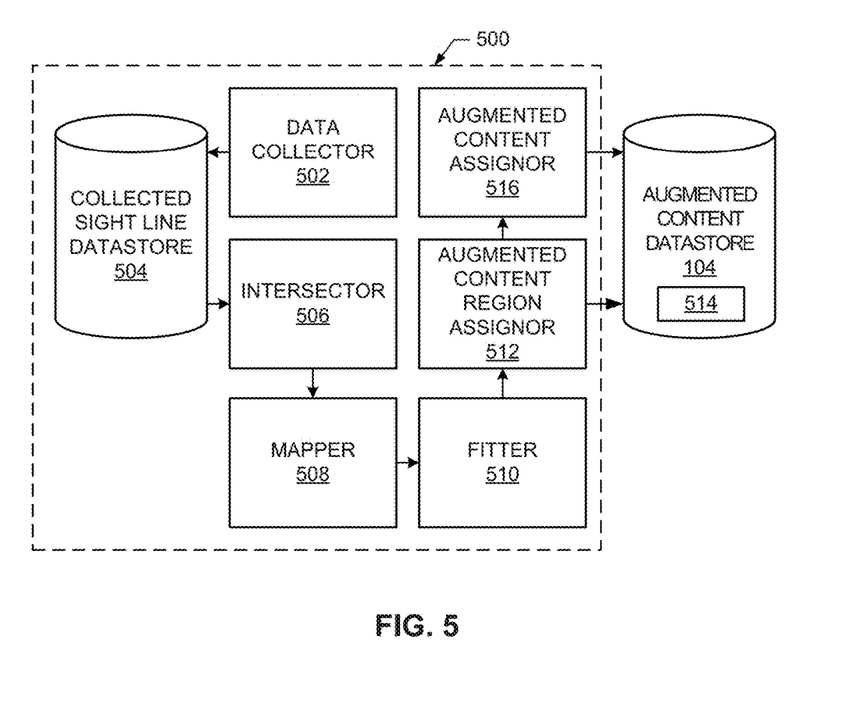
FIG. 5 is a block diagram of an example augmented content generator that may be used to implement the example augmented content generator of FIG. 1, according to this disclosure.

FIG. 5 is a block diagram of an example augmented content generator 500 that may be used to implement the example augmented content generator 120 of FIG. 1. To collect sight line data, the example augmented content generator 500 includes an example data collector 502. The example data collector 502 receives, from location aware devices, data representing their sight lines. In some examples, location aware devices automatically send sight line data when a user, for example, manually presses a button on their location aware device to capture sight line data. Example sight line data includes the coordinates of the location aware device (e.g., GPS coordinates in latitude, longitude, and altitude) and data representing its orientation (e.g., a bearing or heading, and a pitch), and the configured length of the sight line (e.g., 5 feet, 20 feet, 50 feet, infinity, etc.). The data collector 502 stores received sight line data in a collected sight line datastore 504. In some examples, a user can provide a privacy selection (e.g., an opt-in, an opt-out) of storage of their sight line data. In some examples, a user can temporarily opt-out or disable storage of their sight line data for temporary privacy. When a user has opted out, their sight line data would be considered private.

The example collected sight line datastore 504 of FIG. 5 may be implemented using any number and/or type(s) of data structures, and stored on any number and/or type(s) of volatile and/or non-volatile computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

Figure 6:
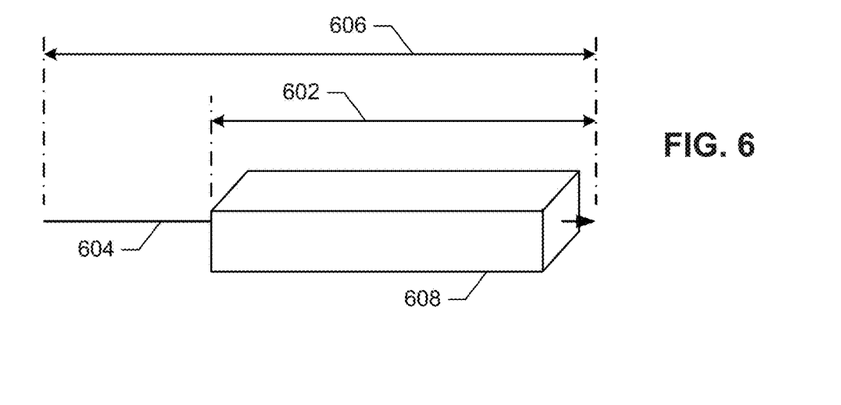
FIG. 6 illustrates an example volume around a sight line for computing intersections of sight lines.
Figure 7:
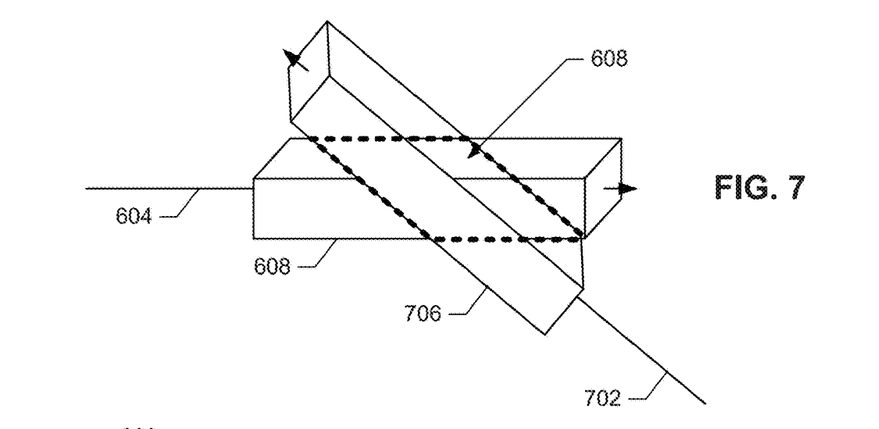
FIG. 7 illustrates an example intersection of two sight lines.

To determine intersections of sight lines, the example augmented content generator 500 of FIG. 5 includes an example intersector 506. Using known mathematical expressions (e.g., from trigonometry, geometry, and vector mechanics), the example intersector 506 of FIG. 5 determines points of intersections between pairs of sight lines (one of which is designated at reference numeral 404 (FIG. 4). Referring to FIG. 6, in some examples, the example intersector 506 only considers a part 602 of a sight line 604. For example, when the length 606 of the sight line 604 is 30 feet, it unlikely that the user is looking at objects in the nearest 33% (10 feet), as their sight line length 606 is indicative of looking at objects in the distance. In some examples, to reduce the effects of measurement tolerances and mathematical precision, a volume 608 about the sight line 604 is included when computing intersection points. Thus, as shown in FIG. 7, the intersection of the example sight lines 604 and another sight line 702 results in a plurality of intersection points 704. The example sight lines 604 and 702 need not be of the same length, nor do the lengths of the volumes 608 and 706 need to be the same. Further, the sizes of the volumes 608 and 706 may vary with the lengths of the sight lines 604 and 702. For example, for longer sight lines, the volume may be larger to accommodate error in measured direction. One or more heuristics may be used to identify the portions of sight lines to include and/or the volumes around the sight lines to use when computing intersection points. In an example set of heuristics, at a very short distance (e.g., 5 feet) use 90% (4.5 feet) of the sight line because they're likely in a building and are interacting with things that are close by. For a very long distance (e.g., infinite), ignore the sight line as it is impractical to identify objects of interest. In between, for example, 100 feet, identify a minimum percentage (e.g., 30%) and maximum percentage (e.g., 70%). For other lengths, scale (e.g., linearly) between the minimum and maximum sight line lengths, and the minimum and maximum percentages. In some examples, a distance greater than 100 feet is ignored. In some examples, the sizes of the volumes 608 and 706 are selected to accommodate a natural tendency to look left, right, up and down by small amounts while the head is pointed in a particular direction.

To create a map of intersection points, the example augmented content generator 500 of FIG. 5 includes an example mapper 508. The example mapper 508 of FIG. 5 maps the intersection points 404 computed by the intersector 506 into a 2D or 3D map. In some examples, the 2D or 3D map defines a grid covering a volume in space at a location, and intersection points are mapped to the closest grid nodes, with the value of a grid node representing the number of intersection points mapped to the grid point. Other mappings may be used.

Figure 8:
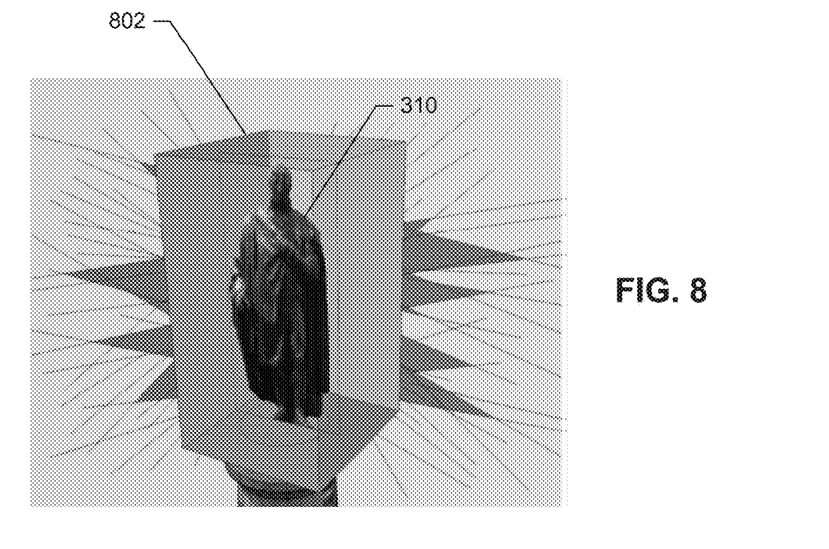
FIG. 8 illustrates an example augmented content region fit to the example 3D map of intersections of FIG. 4.

To fit an augmented content region to the 2D or 3D map, the example augmented content generator 500 of FIG. 5 includes an example fitter 510. The example fitter 510 of FIG. 5 defines a volume 802 (FIG. 8) in space at a location that encompasses some or all the grid nodes having associated intersection points. In some examples, the fitter 510 considers areas with a plurality of intersections that are associated with known objects (e.g., a building, a piece of artwork, a statue 310, etc.). In some examples, the fitter 510 considers areas that are associated with a plurality intersections that are associated with sight lines occurring during a short period of time (e.g., during an elapsed time of 5 minutes, 15 minutes, 1 hour, etc.). Such circumstances may be associated with temporal events of interest, such as natural disasters, scenes of interest, trending topics, accidents, sporting events, weather events, festivals, news events, etc. In some examples, augmented content that may, for example, be of a temporal nature, may be associated with an event of interest. For example, persons passing the scene of an accident may be able to obtain information regarding the drivers, cause of the accident, and injuries, as it is available. In some examples, the augmented content may be transitory (e.g., expire after a period of time, expire after the accident site is cleared away, etc.), or may remain until some future date.

In some examples, heuristics are used to define the shape. For example, if a cylinder fits many, but not all, of the grid nodes associated with more than a certain number of intersections, then a rectangle may be selected and rotated to encompasses the remaining grid nodes. In some examples, the minimum number of intersections that a grid node is associated with is adjusted to select a shape. For example, the number may be increased from 4 to 6, which may result in a denser collection of grid nodes forming a more regular shape (e.g., a rectangle). The shape can then be proportionally increased in size until all the grid nodes with at least 4 associated intersections are encompassed by the shape. In some examples, all the grid nodes associated with one or more intersections are included in the shape. In some examples, the nodes associated with more than a threshold number of intersections are included in the shape. In some examples, shapes are selected from a set of geometric shapes (e.g., rectangles, cuboids, polygons, etc.). In some examples, shapes are fit to nodes associated with intersections using curve fitting methods.

To assign an augmented content region, the example augmented content generator 500 of FIG. 5 includes an example augmented content region assignor 512. The example augmented content region assignor 512 of FIG. 5 creates an example entry 514 for a generated augmented content region (e.g., the example augmented content region 802) in the example augmented content datastore 104, and provides a notification of the augmented content region to, for example, a third-party. Example entries 514 are described above in connection with FIG. 1.

To assign augmented content to augmented content regions (e.g., the example augmented content region 802), the example augmented content generator 500 includes an example augmented content assignor 516. In some examples, the augmented content assignor 516 accesses augmented content from other third-party databases (e.g., tourist information, art databases, building information, etc.). In some examples, a third party (e.g., the owner of an augmented content region) provides the augmented content to the augmented content assignor 516. In some examples, the augmented content assignor 516 identifies augmented content based on the location of the augmented content region. In some examples, the augmented content assignor 516 uses image recognition to obtain augmented content. In some examples, the augmented content assignor 516 requests the augmented content from, for example, a third-party. In some examples, the augmented content is crowd sourced content, for example, similar to Wikipedia.com. In some examples, user's comments are incorporated into the augmented content.

While an example manner of implementing the augmented content generator 120 of FIG. 1 is illustrated in FIG. 5, one or more of the elements, processes and/or devices illustrated in FIG. 5 may be combined, divided, re-arranged, omitted, eliminated and/or implemented in any other way. Further, the example data collector 504, the example collected sight line datastore 504, the example intersector 506, the example mapper 508, the example fitter 510, the example augmented content region assignor 512, the example augmented content assignor 516 and/or, more generally, the example augmented content generator 500 of FIG. 5 may be implemented by hardware, software, firmware and/or any combination of hardware, software and/or firmware. Thus, for example, any of the example data collector 504, the example collected sight line datastore 504, the example intersector 506, the example mapper 508, the example fitter 510, the example augmented content region assignor 512, the example augmented content assignor 516 and/or, more generally, the example augmented content generator 500 of FIG. 5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)), and/or field programmable logic device(s) (FPLD(s)). When reading any of the apparatus or system claims of this patent to cover a purely software and/or firmware implementation, at least one of the example augmented content generator 500, the example data collector 504, the example collected sight line datastore 504, the example intersector 506, the example mapper 508, the example fitter 510, the example augmented content region assignor 512, and the example augmented content assignor 516 of FIG. 5 is/are hereby expressly defined to include a non-transitory machine-readable storage device or storage disk such as a memory, a digital versatile disk (DVD), a compact disc (CD), a Blu-ray disk, etc. Including the software and/or firmware. Further still, the example augmented content generator 500 may include one or more elements, processes and/or devices in addition to, or instead of, those illustrated in FIG. 5, and/or may include more than one of any or all the illustrated elements, processes and devices.

Figure 9:
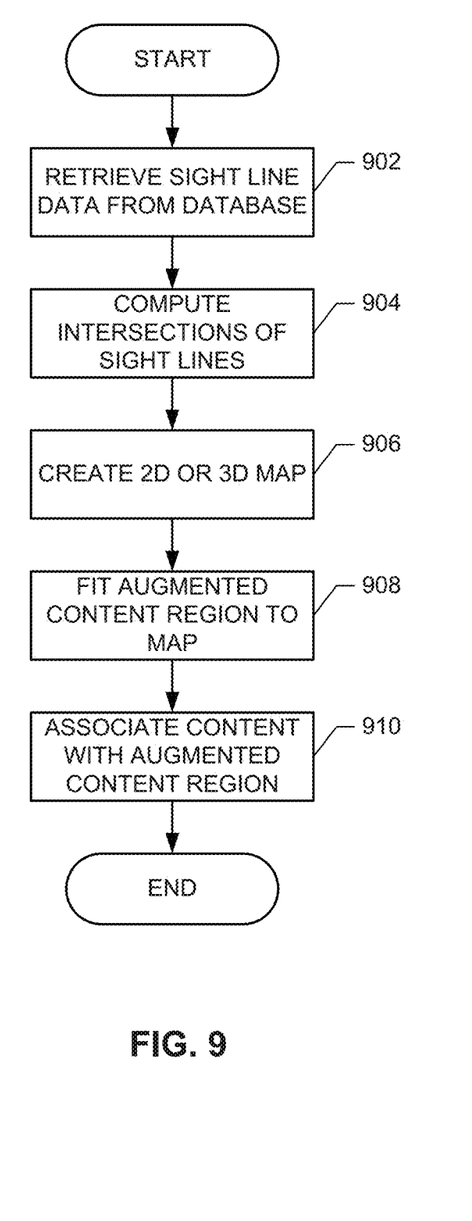
FIG. 9 is a flowchart representing example processes that may be implemented as machine-readable instructions that may be executed to implement the example augmented content generator of FIG. 1 and/or FIG. 5 to define augmented content regions.
Figure 10:
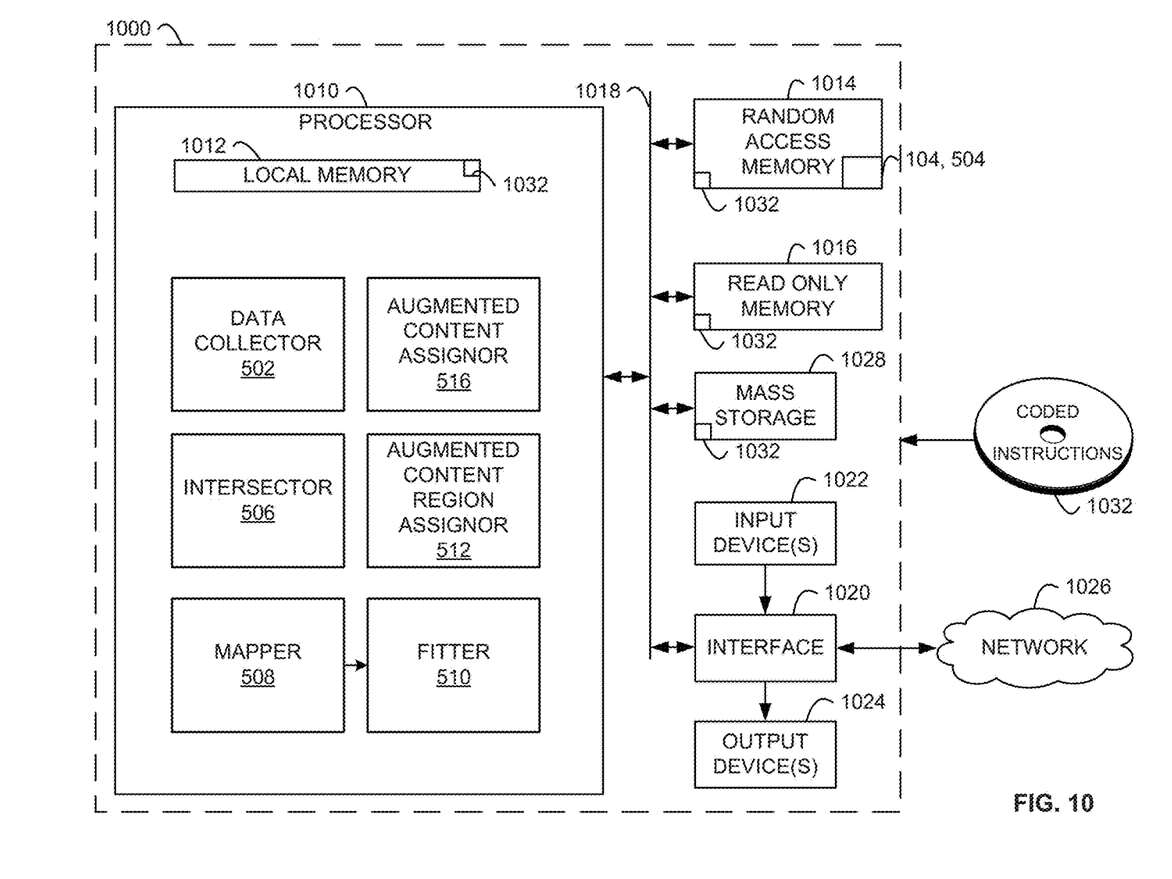
FIG. 10 illustrates an example processor platform structured to execute the example machine-readable instructions of FIG. 9 to implement the example augmented content generator of FIG. 1 and/or FIG. 7.

A flowchart representative of example machine-readable instructions for implementing the example augmented content generator 120 of FIG. 1 and/or the example augmented content generator 500 of FIG. 5 is shown in FIG. 9. In this example, the machine-readable instructions comprise a program for execution by a processor such as the processor 1010 shown in the example processor platform 1000 discussed below in connection with FIG. 10. The program may be embodied in software stored on a non-transitory computer-readable storage medium such as a CD, a floppy disk, a hard drive, a DVD, a Blu-ray disk, or a memory associated with the processor 1010, but the entire program and/or parts thereof could alternatively be executed by a device other than the processor 1010 and/or embodied in firmware or dedicated hardware. Further, although the example program is described with reference to the flowchart illustrated in FIG. 9, many other methods of implementing the example augmented content generator 120 and/or the example augmented content generator 500 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware.

As mentioned above, the example processes of FIG. 9 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

The example program of FIG. 9 includes the example data collector 502 (FIG. 5) accessing sight line data from the example collected sight line datastore 504 (FIG. 5) (block 902). The example intersector 506 (FIG. 5) determines points of intersection between volumes defined around each of a pair of sight lines. The example mapper 508 (FIG. 5) maps intersection points to a 2D or 3D map (e.g., grid) (block 906), and the example fitter 510 (FIG. 5) generates an augmented content region, by mapping a shape to the map (block 908). An augmented content assignor 516 associates augmented content with the generated augmented content region (block 910). Control exits from the example program of FIG. 9.

Additional example methods and systems to implement gaze-directed content delivery are disclosed in U.S. patent application Ser. No. 14/229,561 (now U.S. Pat. No. 9,398,408), entitled "Gaze-Directed Content Delivery," and filed Mar. 28, 2014; and U.S. patent application Ser. No. 15/184,712 (which is a continuation of U.S. patent application Ser. No. 14/229,561), entitled "Gaze-Directed Content Delivery," and filed Jun. 16, 2016. U.S. patent application Ser. No. 14/229,561 and U.S. patent application Ser. No. 15/184,712 are incorporated herein by in their entireties. U.S. patent application Ser. No. 14/229,561 and U.S. patent application Ser. No. 15/184,712 are assigned to Intel Corporation, the assignee of this application.

Example 1 is a method that includes receiving from a plurality of augmented reality (AR) devices data representing a plurality of sight lines captured using the plurality of AR devices, identifying a plurality of commonalities of the plurality of sight lines based on the data representing the plurality of sight lines, and defining an augmented content region based on the plurality of commonalities.

Example 2 includes the method of example 1, wherein identifying the plurality of commonalities includes determining a plurality of intersections of the plurality of sight lines.

Example 3 includes the method of example 1 or 2, wherein identifying the plurality of commonalities includes determining a plurality of overlaps of the plurality of sight lines.

Example 4 includes the method of any of examples 1 to 3, further including associating AR content with the defined augmented content region.

Example 5 includes the method of example 4, further including providing the AR content to an additional AR device when an additional sight line captured using the additional AR device intersects a surface of the defined augmented content region.

Example 6 includes the method of example 4, further including receiving the AR content.

Example 7 includes the method of example 4, further including providing a notification of the augmented content region, and providing a request for the AR content.

Example 8 includes the method of example 4, further including creating the AR content based on an image taken of at least one of a part of the augmented content region, the augmented content region, near the augmented content region, or inside the augmented content region.

Example 9 includes the method of any of examples 1 to 8, further including:
determining an elapsed time associated with the commonalities; and
associating the augmented content region with an event of interest when the elapsed time satisfies a threshold.

Example 10 includes the method of example 9, wherein the event of interest includes at least one of a natural disaster, a scene of interest, a trending topic, an accident, a sporting event, a weather event, a festival, or a news event.

Example 11 includes the method of any of examples 1 to 10, further including receiving a privacy selection for a first of the plurality of AR devices, and excluding first data representing sight lines for the first of the plurality of AR devices from the identifying the plurality of commonalities when the data privacy selection indicates the first data is private data.

Example 12 includes the method of any of examples 1 to 11, wherein identifying the plurality of commonalities of the plurality of sight lines based on the data representing the sight lines includes less than all of a first of the plurality of sight lines, and a region around the first of the plurality of sight lines.

Example 13 is an apparatus including a data collector to receive from a plurality of location aware devices data representing a plurality of sight lines captured using the plurality of location aware devices, an intersector to identify a plurality of commonalities of the plurality of sight lines based on the data, and a fitter to generate an augmented content region based on the plurality of commonalities.

Example 14 includes the apparatus of example 13, wherein the intersector identifies the plurality of commonalities includes by at least one of determining a plurality of intersections of the plurality of sight lines, or determining a plurality of overlaps of the plurality of sight lines.

Example 15 includes the apparatus of example 13 or claim 14, further including an augmented content assignor to associate augmented content with the defined augmented content region.

Example 16 includes the apparatus of claim 15, wherein the intersector determines an elapsed time associated with the commonalities, and the augmented content assignor associates the augmented content region with an event of interest when the elapsed time satisfies a threshold.

Example 17 includes the apparatus of any of examples 13 to 16, further including an augmented content server to provide the augmented content to an additional location aware device when an additional sight line captured using the additional location aware device intersects a surface of the defined augmented content region.

Example 18 includes a non-transitory machine-readable storage medium, comprising instructions that, when executed, cause a machine to perform at least receiving from a plurality of location aware devices data representing a plurality of sight lines captured using the plurality of location aware devices, identifying a plurality of commonalities of the plurality of sight lines based on the data, and defining an augmented content region based on the plurality of commonalities.

Example 19 includes the non-transitory machine-readable storage medium of example 18, including additional instructions that, when executed, cause the machine to perform associating augmented content with the defined augmented content region.

Example 20 includes non-transitory machine-readable storage medium of example 19, including additional instructions that, when executed, cause the machine to perform providing the augmented content to an additional location aware device when an additional sight line captured using the additional location aware device intersects a surface of the defined augmented content region.

Example 21 includes a system including means for receiving from a plurality of location aware devices data representing a plurality of sight lines captured using the plurality of location aware devices, means for identifying a plurality of commonalities of the plurality of sight lines based on the data, and means for generating an augmented content region based on the plurality of commonalities.

Example 22 includes the system of example 21, wherein the means for identifying a plurality of commonalities identifies the plurality of commonalities includes by at least one of determining a plurality of intersections of the plurality of sight lines, or determining a plurality of overlaps of the plurality of sight lines.

Example 23 includes the system of example 21 or 22, further including a means for associating augmented content with the defined augmented content region.

Example 24 includes the system of example 23, wherein the means for identifying a plurality of commonalities determines an elapsed time associated with the commonalities, and the means for associating augmented content associates the augmented content region with an event of interest when the elapsed time satisfies a threshold.

Example 25 includes the system of any of examples 21 to 24, further including a means for providing the augmented content to an additional location aware device when an additional sight line captured using the additional location aware device intersects a surface of the defined augmented content region.

"Including" and "comprising" (and all forms and tenses thereof) are used herein to be open ended terms. Thus, whenever a claim recites anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Conjunctions such as "and," "or," and "and/or" are inclusive unless the context clearly dictates otherwise. For example, "A and/or B" includes A alone, B alone, and A with B. In this specification and the appended claims, the singular forms "a," "an" and "the" do not exclude the plural reference unless the context clearly dictates otherwise.

Any references, including publications, patent applications, and patents, cited herein are hereby incorporated by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   identifying a plurality of commonalities of a plurality of sight lines based on data representing the plurality of sight lines obtained from a plurality of augmented reality (AR) devices;
   mapping the plurality of commonalities to at least one of a 2D map or a 3D map, the at least one of the 2D map or the 3D map defining a corresponding 2D or 3D grid of nodes, different ones of the plurality of commonalities mapped to different ones of the nodes; and
   generating an augmented content region by:
      defining a geometry of a shape at a location in the at least one of the 2D map or the 3D map, the shape having boundaries that encompass ones of the nodes associated with corresponding ones of the plurality of commonalities, the geometry of the shape based on the nodes associated with a first threshold number of commonalities greater than one; and
      defining a size of the shape based on the nodes associated with a second threshold number of commonalities, the first threshold number greater than the second threshold number.

2. The method of claim 1, wherein the identifying of the plurality of commonalities includes determining at least one of a plurality of overlaps or a plurality of intersections of the plurality of sight lines.

3. The method of claim 1, further including associating AR content with the generated augmented content region.

4. The method of claim 3, further including providing the AR content to an additional AR device when an additional sight line captured using the additional AR device intersects a surface of the generated augmented content region.

5. The method of claim 3, further including:
   providing a notification of the augmented content region;
   providing a request for the AR content; and
   obtaining the AR content.

6. The method of claim 3, further including creating the AR content based on an image taken of at least one of: (a) a part of the augmented content region, (b) the augmented content region, (c) near the augmented content region, or (d) inside the augmented content region.

7. The method of claim 1, further including:
   determining an elapsed time associated with the commonalities; and
   associating the augmented content region with an event of interest when the elapsed time satisfies a threshold.

8. The method of claim 7, wherein the event of interest includes at least one of a natural disaster, a scene of interest, a trending topic, an accident, a sporting event, a weather event, a festival, or a news event.

9. The method of claim 1, further including:
   in response to a privacy selection for a first of the plurality of AR devices, excluding first data representing sight lines for the first of the plurality of AR devices from the plurality of commonalities when the privacy selection indicates the first data is private data.

10. The method of claim 1, wherein the identifying of the plurality of commonalities of the plurality of sight lines is based on less than a full length of a first of the plurality of sight lines, and a region around the first of the plurality of sight lines.

11. The method of claim 1, wherein the data includes first data from a first AR device at a first point in time and second data from a second AR device at a second point in time different from the first point in time, and further including identifying the plurality of commonalities based on the first and second data.

12. An apparatus, comprising:
   a data collector to collect data representing a plurality of sight lines captured by a plurality of location aware devices, the data including an indication of lengths associated with different ones of the sight lines;
   an intersector tool to identify a plurality of commonalities of the plurality of sight lines based on the data, the plurality of commonalities along particular segments of the plurality of sight lines, the particular segments being less than the lengths of the corresponding sight lines, a first particular segment of a first sight line having a first length, the first particular segment being a first proportion of the first length, and a second particular segment of a second sight line having a second length, the second particular segment being a second proportion of the second length, the first proportion being greater than the second proportion when the first length is longer than the second length; and a fitter tool to generate an augmented content region based on the plurality of commonalities.

13. The apparatus of claim 12, wherein the intersector tool is to identify the plurality of commonalities by at least one of determining a plurality of intersections of the plurality of sight lines, or determining a plurality of overlaps of the plurality of sight lines.

14. The apparatus of claim 12, further including an augmented content assignor tool to associate augmented content with the augmented content region.

15. The apparatus of claim 14, wherein the intersector tool is to determine an elapsed time associated with the commonalities, and the augmented content assignor tool is to associate the augmented content region with an event of interest when the elapsed time satisfies a threshold.

16. The apparatus of claim 12, further including an augmented content server to provide the augmented content to an additional location aware device in response to an additional sight line captured using the additional location aware device intersecting a surface of the generated augmented content region.

17. A non-transitory computer-readable storage medium, comprising instructions that, when executed, cause a machine to at least:

store data representing a plurality of sight lines captured by a plurality of location aware devices;

identify a plurality of commonalities of the plurality of sight lines based on the data;

map the plurality of commonalities to at least one of a 2D map or a 3D map, the at least one of the 2D map or the 3D map defining a corresponding 2D or 3D grid of nodes, different ones of the plurality of commonalities mapped to different ones of the nodes; and generate an augmented content region by:

defining a geometry of a shape at a location in the at least one of the 2D map or the 3D map, the shape having boundaries that encompass ones of the nodes associated with corresponding ones of the plurality of commonalities, the geometry of the shape based on the nodes associated with a first threshold number of commonalities greater than one; and defining a size of the shape based on the nodes associated with a second threshold number of commonalities, the first threshold number greater than the second threshold number.

18. The non-transitory computer-readable storage medium of claim 17, wherein the instructions, when executed, cause the machine to associate augmented content with the augmented content region.

19. The non-transitory computer-readable storage medium of claim 18, wherein the instructions, when executed, cause the machine to provide the augmented content to an additional location aware device when an additional sight line captured using the additional location aware device intersects a surface of the generated augmented content region.

* * * * *